(12) United States Patent
Brown et al.

(10) Patent No.: US 11,474,337 B2
(45) Date of Patent: Oct. 18, 2022

(54) INTEGRATED OPTICAL SIGHTING SYSTEM

(71) Applicant: Raytheon Canada Limited, Ottawa (CA)

(72) Inventors: Douglas J. Brown, Midland (CA); Ryan Walter Nobes, New Lowell (CA); Brien D. Ross, Wyevale (CA); Michael David Thorpe, Penetanguishene (CA); Kevin Burgess Wagner, Wyevale (CA)

(73) Assignee: Raytheon Canada Limited, Ottawa (CA)

( * ) Notice: Subject to any disclaimer, the term of this patent is extended or adjusted under 35 U.S.C. 154(b) by 386 days.

(21) Appl. No.: 16/645,277

(22) PCT Filed: Sep. 29, 2017

(86) PCT No.: PCT/CA2017/000214
§ 371 (c)(1),
(2) Date: Mar. 6, 2020

(87) PCT Pub. No.: WO2019/060975
PCT Pub. Date: Apr. 4, 2019

(65) Prior Publication Data
US 2020/0284551 A1 Sep. 10, 2020

(51) Int. Cl.
*F41G 1/38* (2006.01)
*G02B 23/10* (2006.01)
(Continued)

(52) U.S. Cl.
CPC ............... *G02B 23/10* (2013.01); *G02B 1/00* (2013.01); *F41G 1/38* (2013.01); *F41G 3/065* (2013.01)

(58) Field of Classification Search
CPC ............ F41G 1/473; F41G 1/38; G02B 23/10
See application file for complete search history.

(56) References Cited

U.S. PATENT DOCUMENTS 5,771,623 A 6/1998 Pernstich et al.
8,599,482 B2 12/2013 Schlierbach
(Continued)

FOREIGN PATENT DOCUMENTS

WO 2008099939 A1 8/2008
WO 2014130128 A2 8/2014

OTHER PUBLICATIONS

International Search Report and Written Opinion for International Application No. PCT/CA2017/000214 dated Apr. 30, 2018.
(Continued)

*Primary Examiner* — J. Woodrow Eldred
(74) *Attorney, Agent, or Firm* — Lando & Anastasi, LLP

(57) ABSTRACT

A direct view optical sighting system. In certain examples the system includes an eyepiece, an objective that directs scene light to the eyepiece, a laser rangefinder, and a laser rangefinder coupling prism that directs a laser transmit beam from the laser rangefinder to the objective and a laser return beam from the objective to the laser rangefinder. Examples of the system further include a display assembly including a reticle prism and a display coupling prism, the reticle prism being positioned along the optical path between the laser rangefinder coupling prism and the display coupling prism and having a hard reticle formed on a surface thereof. The objective can be configured to produce a first focal plane of the optical sighting system coincident with the first surface of the reticle prism. The display coupling prism is configured to direct display light toward the eyepiece. Examples of the system also include a zoom relay positioned between the display coupling prism and the eyepiece and configured to adjust a magnification of the optical sighting system.

19 Claims, 8 Drawing Sheets

(51) Int. Cl.
  *G02B 1/00*    (2006.01)
  *F41G 3/06*    (2006.01)

(56)         References Cited

U.S. PATENT DOCUMENTS 9,285,189  B1     3/2016   Zhang et al.
  2005/0219690  A1  10/2005  Lin et al.
  2009/0174939  A1  7/2009   Heintz et al.
  2009/0223107  A1* 9/2009   Lin ..................... F41G 3/065
                                                            42/115
  2016/0223805  A1* 8/2016   Waterman ............ G02B 23/04
  2020/0018566  A1* 1/2020   Tubb .................... F41G 1/473
  2020/0026058  A1* 1/2020   Maryfield .......... G02B 26/0891

OTHER PUBLICATIONS

Extended European Search Report in European Patent Application No. 17926851.1 dated Apr. 19, 2021.

* cited by examiner

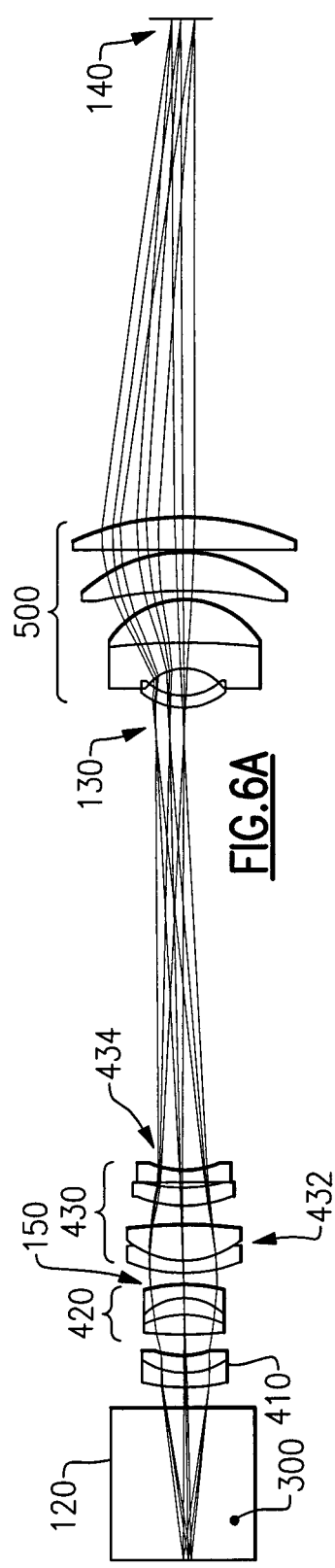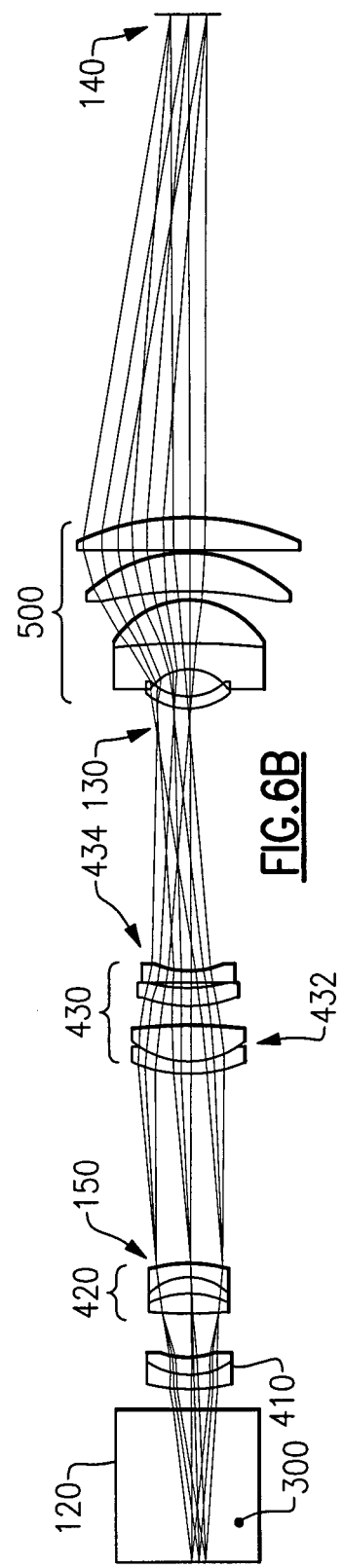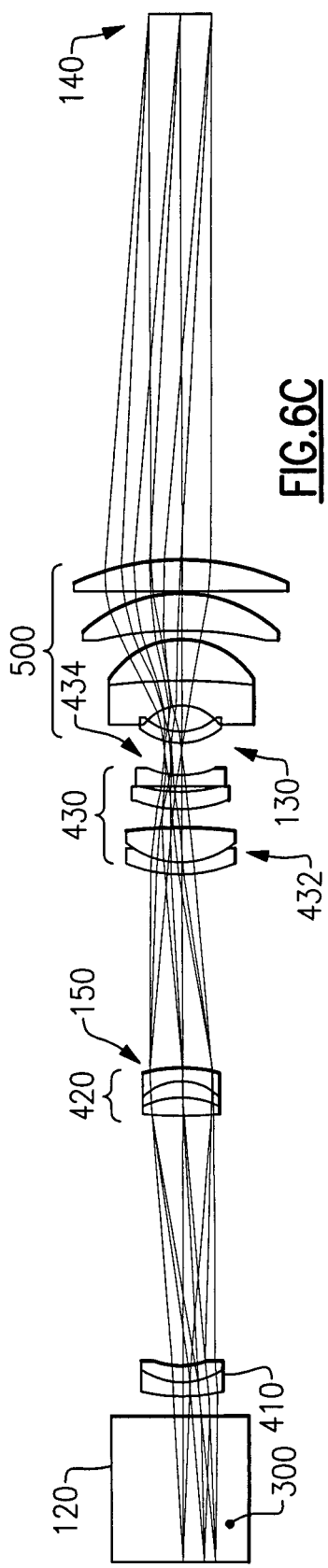

INTEGRATED OPTICAL SIGHTING SYSTEM

CROSS-REFERENCE TO RELATED APPLICATIONS

This application is a U.S. National Stage Application and claims the benefit under 35 U.S.C. § 371 of PCT/CA2017/000214, titled INTEGRATED OPTICAL SIGHTING SYSTEM, filed Sep. 29, 2017, which is incorporated by reference herein in its entirety for all purposes.

BACKGROUND

A significant challenge in military sighting systems is to provide a riflesight with a large magnification range that both is compact and incorporates modern capabilities such as an electronic display and integrated laser rangefinder (LRF). The display/rangefinder capability can potentially greatly enhance the single shot accuracy of the sight by providing a targeting reticle which is perturbed in position to compensate for bullet drop at the measured target range. U.S. PG-Pub. No. 2016/0223805, for example, discloses a riflesight that includes an integrated laser rangefinder and display tied to the erector tube of the sight.

SUMMARY OF INVENTION

Aspects and embodiments are directed to an optical zoom sighting system, as may be used as a riflesight, for example, having an integrated electronic display with laser rangefinding capability in a compact package.

According to one embodiment a direct view optical sighting system comprises an eyepiece, and an objective configured to receive scene light from a viewed scene and direct the scene light along an optical path to the eyepiece. The direct view optical sighting system further comprises a laser rangefinder configured to emit a laser transmit beam and to receive a laser return beam corresponding to at least a portion of the laser transmit beam reflected from an object in the viewed scene, and a laser rangefinder coupling prism configured to direct the laser transmit beam from the laser rangefinder to the objective via reflections off two surfaces of the laser rangefinder coupling prism, and to direct the laser return beam from the objective to the laser rangefinder via reflections off the two surfaces of the laser rangefinder coupling prism. The direct view optical sighting system further comprises a display assembly including a reticle prism and a display coupling prism, the reticle prism being positioned along the optical path between the laser rangefinder coupling prism and the display coupling prism, the reticle prism having a hard reticle formed on a first surface thereof, the objective being configured to produce a first focal plane of the optical sighting system coincident with the first surface of the reticle prism, the display coupling prism being configured to couple display light into the optical path and to direct the display light toward the eyepiece via reflections off two surfaces of the display coupling prism. The direct view optical sighting system further comprises a zoom relay positioned between the display coupling prism and the eyepiece, the zoom relay being configured to relay the scene light along the optical path from the first focal plane to a second focal plane positioned between the zoom relay and the eyepiece, the zoom relay being further configured to adjust a magnification of the optical sighting system over a predetermined magnification range, and an aperture stop of the optical sighting system being positioned within the zoom relay.

In one example the eyepiece is configured to receive and collimate the scene light and the display light from the second focal plane to produce a collimated output beam at an exit pupil of the optical sighting system. The eyepiece may include a field lens, a first eyepiece lens, a second eyepiece lens positioned along the optical path between the first eyepiece lens and the exit pupil, and an eyepiece doublet lens positioned along the optical path between the field lens and the first eyepiece lens. In one example the field lens is made of glass specified by international glass code 699300, the eyepiece doublet of glasses specified by international glass codes 102180/593673, the first eyepiece lens is made of glass specified by international glass code 593673, and the second eyepiece lens is made of glass specified by international glass code 804465.

In one example the two surfaces of the laser rangefinder coupling prism include a first surface and an embedded dichroic mirror, the embedded dichroic mirror being configured to transmit the scene light along the optical path and to reflect the laser transmit beam and the laser return beam, and the first surface being arranged at an angle of 30 degrees relative to the dichroic mirror and configured to reflect the laser transmit beam and the laser return beam.

In another example the laser rangefinder includes a laser source configured to emit the laser transmit beam, a detector configured to receive the laser return beam, and a beamsplitter assembly configured to direct the laser transmit beam toward to the laser rangefinder coupling prism and to direct the laser return beam to the detector. The beamsplitter assembly may include a pick-off mirror that reflects the laser transmit beam toward the laser rangefinder coupling prism, the pick-off mirror being positioned as a central obscuration in a path of the laser return beam, such that the laser return beam has an annular footprint at the detector.

In another example the two surfaces of the display coupling prism include a first surface and an embedded dichroic mirror, the first surface being arranged at an angle of 30 degrees relative to the dichroic mirror and configured to reflect the display light onto the embedded dichroic mirror, and the embedded dichroic mirror being configured to transmit the scene light along the optical path and to reflect the display light into the optical path toward the zoom relay. In one example the embedded dichroic mirror is a reflective notch dichroic mirror having a green or red reflection band. In another example the display assembly further includes a display configured to produce the display light, the display light including an electronic reticle and sighting information. The direct view optical sighting system may further comprise an electronic control system, the electronic control system including a display adjustment mechanism configured to maintain a constant size of the electronic reticle and a constant font size of the sighting information over the magnification range of the optical sighting system. In one example the display adjustment mechanism includes a linear potentiometer coupled to at least one component of the zoom relay.

In another example the zoom relay includes a field lens, a first movable zoom lens group, and a second movable zoom lens group positioned between the first movable zoom lens group and the exit pupil, wherein movement of the first and second movable zoom lens groups along the optical path adjusts the magnification of the optical sighting system over the magnification range. In one example the magnification range is 1× to 8×. The zoom relay may be configured to provide a constant image position for the aperture stop over the magnification range, the image position corresponding to a location of the exit pupil. In one example the aperture stop is located within the second movable zoom lens group.

In one example the field lens is a doublet made of a combination of a first glass material having ultra-low dispersion and high refractive index, and a second glass material having a high refractive index and high dispersion. In another example the first movable zoom lens group is a triplet, and the second movable zoom lens group includes two doublets, the triplet and the two doublets including a combination of glass materials having different dispersion.

The direct view optical sighting system may further comprise a housing, the eyepiece, the objective, the laser rangefinder coupling prism, the display assembly, and the zoom relay being housed within the housing. The housing may include a zoom drive ring coupled to at least one component of the zoom relay, wherein rotation of the zoom drive ring adjusts the magnification of the optical sighting system over the magnification range.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 6A-6C are partial ray traces of an example of the zoom relay operating at three different magnifications, according to aspects of the present invention;

DETAILED DESCRIPTION

In many applications it can be very advantageous to have an optical sighting system, such as a riflesight, that provides high magnification (for long range use) and includes capabilities such as an electronic display and integrated laser rangefinder (LRF). In order to be accurately boresighted to the scene, the display must be in the so called first focal plane of the sight, which is the image plane of the riflesight objective. A further challenge is to provide these electro-optical capabilities in a compact package with high coupling efficiency for the display and LRF so as to minimize power requirements in a portable system.

Aspects and embodiments are directed to an integrated optical zoom sighting system, also referred to herein as a sight or riflescope, having a compact package while including an information display in the first image plane so that display information is both superimposed on the scene and boresighted to the aiming system. Furthermore, embodiments incorporate an eyesafe laser rangefinder which is boresighted to the objective. The sight is made compact by reducing the focal length of the objective and optical zooming group(s) and solving the build challenges of a tightly toleranced assembly. As discussed in more detail below, the objective may include two prism blocks, which allow very efficient injection of a laser rangefinder and an electronic display, both of which are aligned to the reticle plane.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
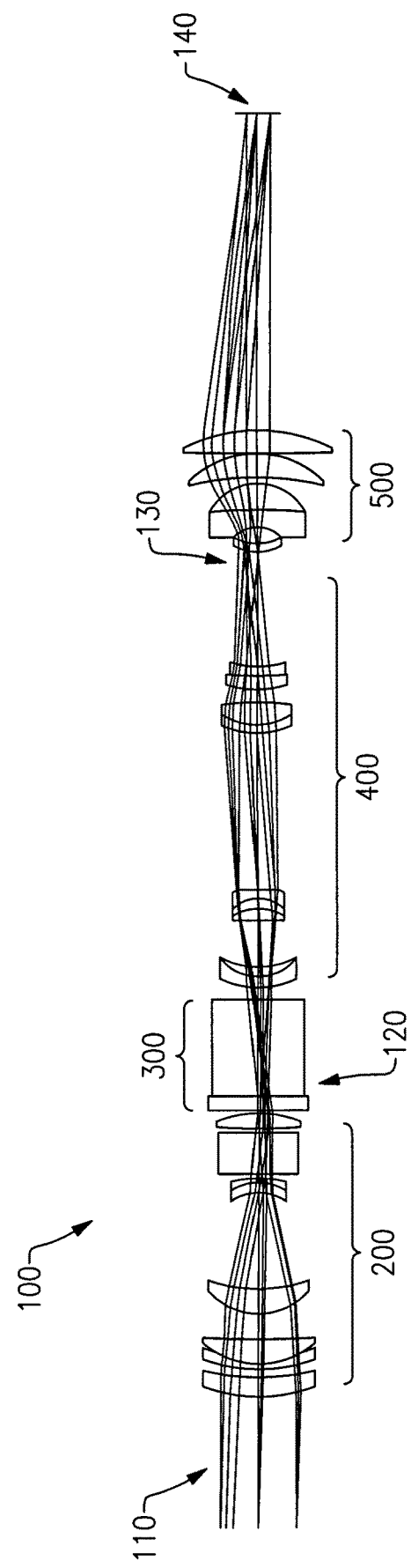
FIG. 1 is a partial ray trace of one example of an optical sighting system according to aspects of the present invention.

Referring to FIG. 1, there is illustrated a simplified optical layout of one example of a sight 100 according to certain embodiments. The sight 100 includes four functional groups, namely an objective and laser rangefinder assembly 200, a reticle and display cluster 300, a zoom relay 400, and an eyepiece 500. The objective and laser rangefinder assembly 200 images a viewed scene (represented by electromagnetic radiation 110) onto a first image plane 120. The first image plane 120 is also referred to as the reticle plane, and is contained within the reticle and display cluster 300. The objective and laser rangefinder assembly 200 further provides an efficient transmit/receive path for the eyesafe laser rangefinder, which is coupled in/out of the optical path using an internal prism block, as discussed in more detail below. The objective and laser rangefinder assembly 200 also provides the zeroing capability of the sight 100 through a set of decenterable optics. As discussed further below, the reticle and laser rangefinder target are co-boresighted as the zeroing capability offsets both the scene and laser rangefinder channels. The reticle and display cluster 300 provides a hard reticle, and efficiently overlays a digital reticle on the hard reticle. According to certain embodiments, the reticle and display cluster 300 may also provide the sight 100 with advanced targeting capability by digitally offsetting the digital reticle in elevation and azimuth through software, as discussed further below. The zoom relay 400 magnifies the scene image at the first image plane 120 by a specified amount (which may be selected by a user of the sight 100), effectively varying the magnification at the eye and redisplays the magnified image at a second image plane 130. In certain examples the magnification range provided by the zoom relay 400 is 1× to 8×. The eyepiece 500 views the image at the second image plane 130, converting the sight 100 to an afocal system as preferred by the human eye.

Figure 2:
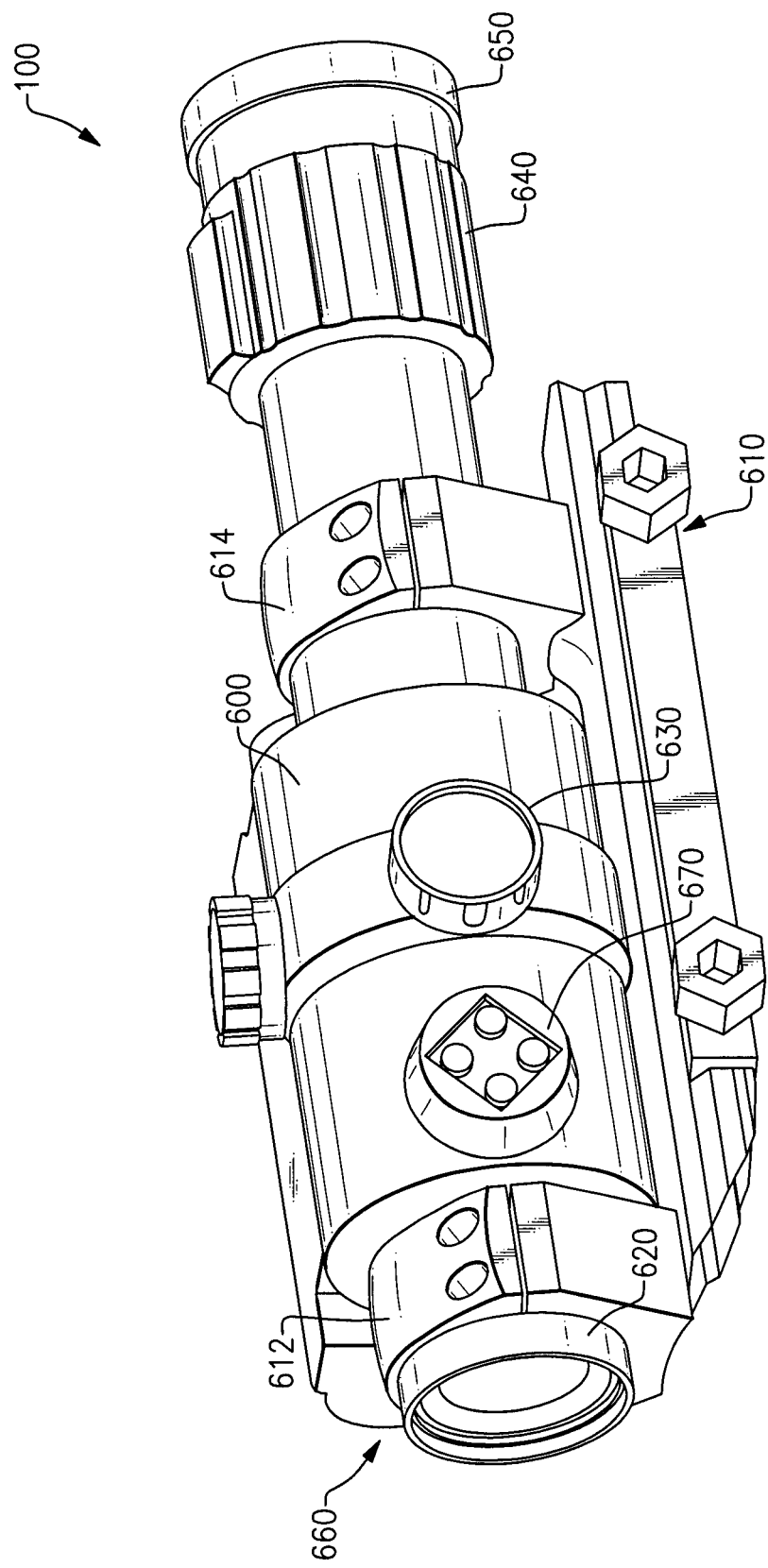
FIG. 2 is a diagram of one example of the optical sighting system showing an example of the mechanical assembly and packaging, according to aspects of the present invention.

FIG. 2 illustrates an exterior, perspective view of one embodiment of the sight 100 showing an example of the mechanical assembly and packaging. The sight 100 includes a housing 600 that houses the optical and electronic components of the sight, along with a power supply. According to certain embodiments, the sight 100 can be configured as a ring mounted scope, as shown in FIG. 2, with adjustable internal zeroing, as discussed further below. In this example, the housing 600 is roughly cylindrical in shape, and a mount 610 includes a pair of rings 612, 614 that encircle the diameter of the housing 600 towards the front and rear of the sight. Those skilled in the art will appreciate, however, that other mounting systems can be used.

Various features and functions of components of embodiments of the sight 100 are discussed below with continuing reference to FIGS. 1 and 2.

Figure 3:
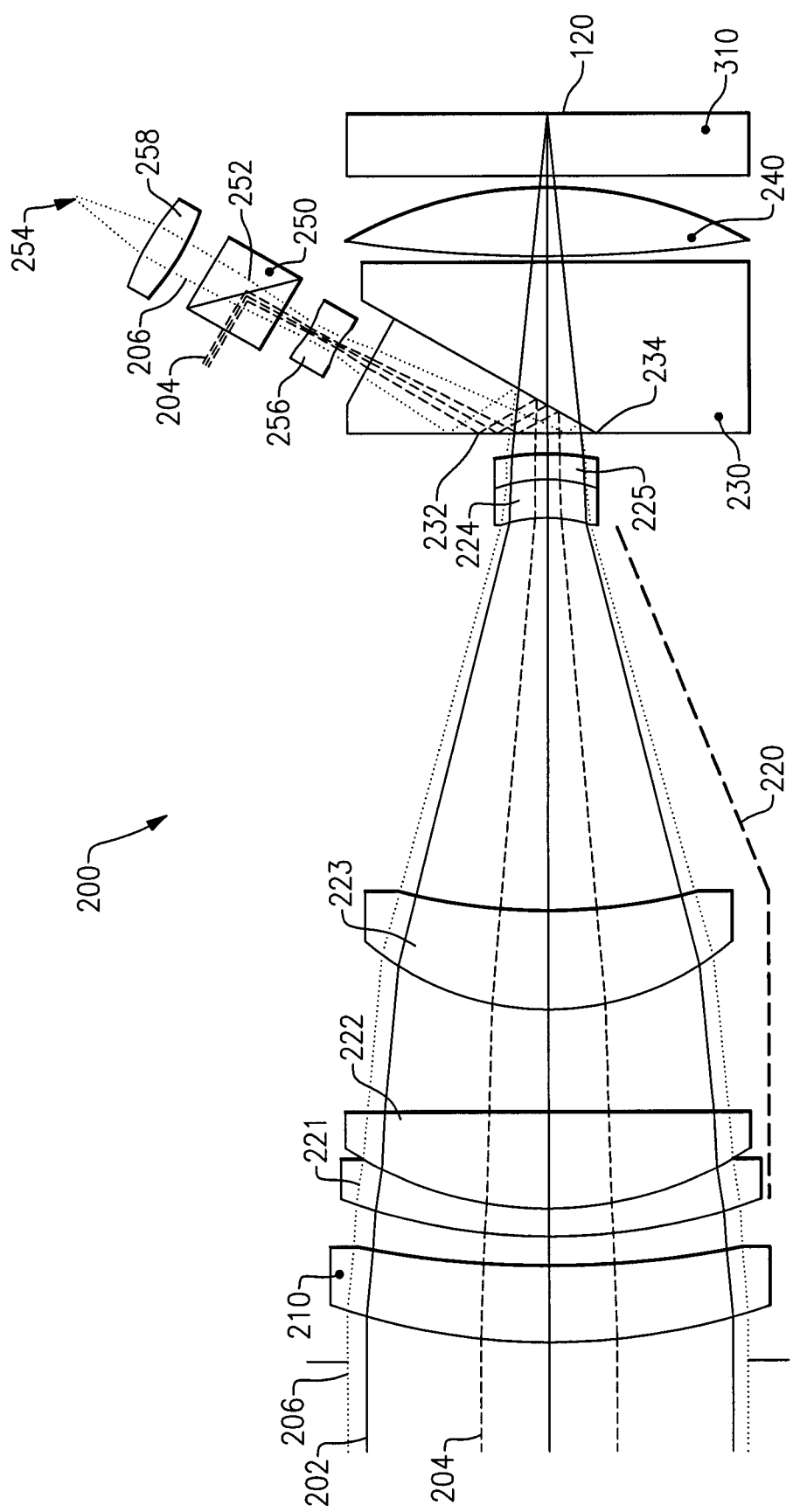
FIG. 3 is a partial ray trace of one example of the objective and laser rangefinder assembly of the optical sighting system of FIG. 1 according to aspects of the present invention.

FIG. 3 is a diagram and partial ray trace illustrating an example of the objective and laser rangefinder assembly 200 according to certain embodiments, together with a reticle prism 310 that is part of the reticle and display cluster 300. In one example, the objective includes a first optical element 210 that is fixed at the front end of the sight (indicated at region 620 in FIG. 2) and which seals the assembly. In the illustrated example, the first optical element 210 is a lens. The objective further includes a zeroing group 220 of lenses, which contains most of the optical power of the objective, a laser rangefinder coupling prism 230, and a field lens 240.

Figure 4:
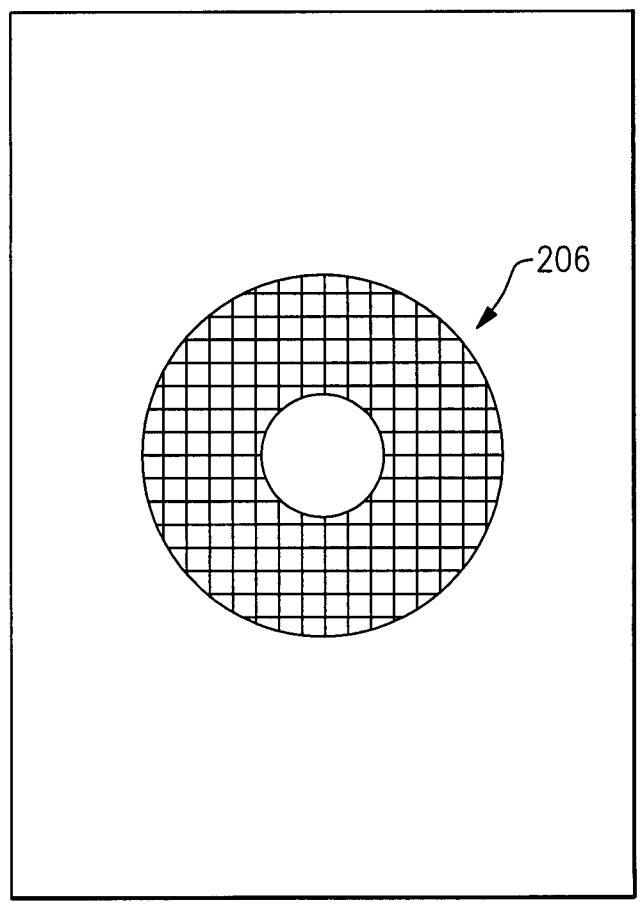
FIG. 4 is a diagram showing an example of the laser return beam footprint according to aspects of the present invention.

The objective handles three optical channels, which are boresighted during assembly of the sight 100. In a first optical channel, light 202 from the scene is imaged onto the reticle plane 120 located on the rear surface of the reticle prism 310 which is part of the reticle and display cluster 300. In a second optical channel, light 204 emitted by a laser of the laser rangefinder assembly is folded 90 degrees by a transmit pickoff mirror 252 in a transmit/receive beamsplitter assembly 250 and directed into the laser rangefinder coupling prism 230 where it reflects via total internal reflection off the front face 232 of the prism and is reflected by a dichroic mirror 234 to be collimated in a relatively narrow output beam by the powered optical elements of the objective. This laser light 204 strikes and then scatters off a distant target and the fraction of this light returning to the sight 100 constitutes the laser return beam 206. The laser return beam 206 is focused towards the laser rangefinder coupling prism 230 where it traverses a similar path to the transmit laser light 204, but in reverse. The laser return beam 206 reflects off the dichroic mirror 234, reflects via total internal reflection (indicated at 232) off the front face 232 of the prism, and then traverses the transmit/receive beamsplitter assembly 250 and is focused to an image plane 254 at which a detector can be located. The laser transmit and receive path is common through the objective optics, as shown in FIG. 3. Accordingly, in order to achieve beam separation, the objective and laser rangefinder assembly 200 uses the spot transmit pickoff mirror 252, which acts as a central obscuration for the smaller F-number laser return beam 206 while enabling maximum transmission of the narrower laser transmit beam 204. Some of the laser return light 206 is obscured by the transmit pickoff mirror 252, such that the return beam footprint is annular, as shown in FIG. 4.

In the example of FIG. 3, the laser transmit and receive path further includes a first lens 256 and a second lens 258, the two lenses positioned on either side of the transmit/receive beamsplitter assembly 250. However, those skilled in the art will appreciate that the laser transmit and receive path may include more of fewer optical elements as may be needed to condition the laser transmit light 204 and the laser return light 206, depending on the application and system configurations, for example.

As noted above, the laser rangefinder coupling prism 230 is located behind the powered optical elements of the objective (the first optical element 210 and the zeroing group 220). Positioning the laser rangefinder coupling prism in this location, as shown in FIG. 3, allows the aiming of the laser to be adjusted with the aiming of the sight 100 such that they remain co-aligned.

Zeroing capability is provided for all three optical channels in common by decentering the optical elements of the zeroing group 220. According to certain embodiments, the optical elements of the zeroing group 220 are packaged together in a cell that pivots to provide boresight correction control. In one example the cell can pivot using a ball and socket configuration. In another example the cell pivots on a universal joint. Those skilled in the art will appreciate that a variety of other pivoting mechanisms may be used. Referring to FIG. 2, in one example, the zeroing group 220 is houses and mounted such that a zero dial 630 can be used to provide zeroing adjustment in elevation or azimuth. For example, a user of the sight 100 can turn the zero dial 630 clockwise or anticlockwise to make adjustments.

Conventionally, the zeroing mechanism of a zoom sight pivots the zoom lens assembly about the image plane, which does not contain the reticle. Accordingly, for a first focal plane reticle, the pivot point would be at the second focal plane, and a pivoting action would effectively move the scene image produced by the objective relative to the reticle. In a conventional arrangement with the zeroing mechanism operating in the zoom lens group, this would force the prism block, display, and laser rangefinder assembly to all move together for a first focal plane reticle. This is the approach taken in U.S. PG-Pub. No. 2016/0223805, for example. However, it is not very practical to move such a large mass in this type of integrated system. Instead, in embodiments of the sight 100, the zeroing function is implemented in the objective, rather than in the zoom relay 400. Thus, certain optical elements of the objective, namely the zeroing group 220, pivot to zero the sight, leaving the electro-optic components (such as the display and the laser rangefinder) and their coupling prisms 230, xxx, fixed in position. This arrangement advantageously reduces the moving mass and simplifies the mechanics for the sight 100.

In the examples illustrated in FIGS. 1 and 3, the zeroing group 220 includes five lenses; however, those skilled in the art will appreciate, given the benefit of this disclosure, that other arrangements of more or fewer optical elements can be used. In certain embodiments, the objective and laser rangefinder assembly 200 is very compact, and includes a high degree of color and aberration correction. This is achieved through the use of low-dispersion and high refractive index materials for the lenses in the objective. In the example illustrated in FIG. 3, the zeroing group 220 consists of a first doublet made up of first and second lenses 211 and 212, respectively, a third lens 213, and a second doublet made up of fourth and fifth lenses 214 and 215, respectively. The materials of the tow doublets can be chosen such that each doublet includes one lens made of a material with a high refractive index and the other lens made of a material with a lower refractive index. In one example, the materials of the first doublet are (specified using the international glass codes) 855366/497816 for lenses 211/212, respectively, and the materials of the second doublet are 456902/953323 for lenses 214/215, respectively. In this example, the third lens 213 is made of fused silica (international glass code 458678). The first three digits of the international glass codes specify the refractive index of the glass. For example, material 855366 has a refractive index of 1.855. Thus, as discussed above, in this example, each doublet includes a lens made of a high index material and a lens made of a lower index material. The fused silica element is used primarily to reduce the thermal sensitivity of the objective so that the scene image does not displace from the reticle plane 120 as the ambient temperature changes. Otherwise, this image displacement, seen as parallax, would introduce a targeting error. The field lens 240 may also be made of a material having a high refractive index. In one example the field lens is made of a high index glass, such as international glass code 953323. The use of these types of materials allows the objective to be very compact. According to certain embodiments, high index glass and low dispersion glass are used for as many optical elements as possible in the sight 100 to maintain a compact design which is still well corrected, giving excellent image quality.

The scene light 202 is generally photopic, peaked at 550 nanometers (nm), whereas the laser light 204, 206 can be chosen to be eyesafe, for example, having a wavelength of 980 nm or 1500 nm, such that there can be a large separation in the visual and laser wavebands of interest. Accordingly, the laser in/out coupling can be done very efficiently and with reduced angular spectral-shift by using the "double bounce" reflection system shown in FIG. 3. In particular, the laser rangefinder coupling prism 230 includes two reflecting surfaces, namely the front face 232 oriented for total internal reflection and the dichroic mirror 234 oriented at 30 degrees relative to the front face 232. In an alternate configuration, a conventional 45 degree prism with a narrow band dichroic filter can be used for folding the laser light 204, 206 in and out of the objective channel while allowing the visible light 202 to be transmitted to the reticle plane 120. However, the design of a polarization independent efficient 45 degree narrow band mirror coating (for the dichroic mirror surface 234) requires many layers and the design is angularly sensitive for polarization and wavelength, leading to shading effects. In contrast, according to certain embodiments, the laser light 204 is injected using a first bounce utilizing total internal reflection off the prism input face 232, followed by a second bounce off the narrow band dichroic mirror 234 working at 30 degrees. With this arrangement, the dichroic mirror 234 can be much more efficient with a relatively simple narrow band coating, and the shading effects are eliminated. This efficiency works in both the laser transmit and laser receive channels, and advantageously reduces the required laser ranging pulse power.

In order to support the dual-band nature of the objective and laser rangefinder assembly 200, the optical coatings used on the prism/mirror surfaces can be carefully designed to give maximum efficiency in both the photopic band and at the laser wavelength(s). For a given laser-power and number of coated surfaces, the ranging capabilities of the laser rangefinder scales with coating transmission-efficiency in the laser waveband. Similarly, the color-rendition of the visible-channel image as seen by the user has higher fidelity and is brighter with a flat transmission response across the visible waveband (e.g., 420-680 nm) the better the coating transmission-efficiency. As discussed above, the coatings within the laser rangefinder coupling prism 230 are made much simpler by the use of a 30° angle-of-incidence immersed dichroic mirror 234, rather than a conventional 45° prism. This eliminates the need for a layer-intensive harmonic-suppression approach, as the harmonics of the dichroic mirror 234 in the laser waveband do not interfere with the transmission of the visible waveband. Another significant advantage of the configuration of the laser rangefinder coupling prism 230 disclosed herein and shown in FIG. 3 is that angular shift of the coating on the dichroic mirror 234 is reduced.

Figure 5:
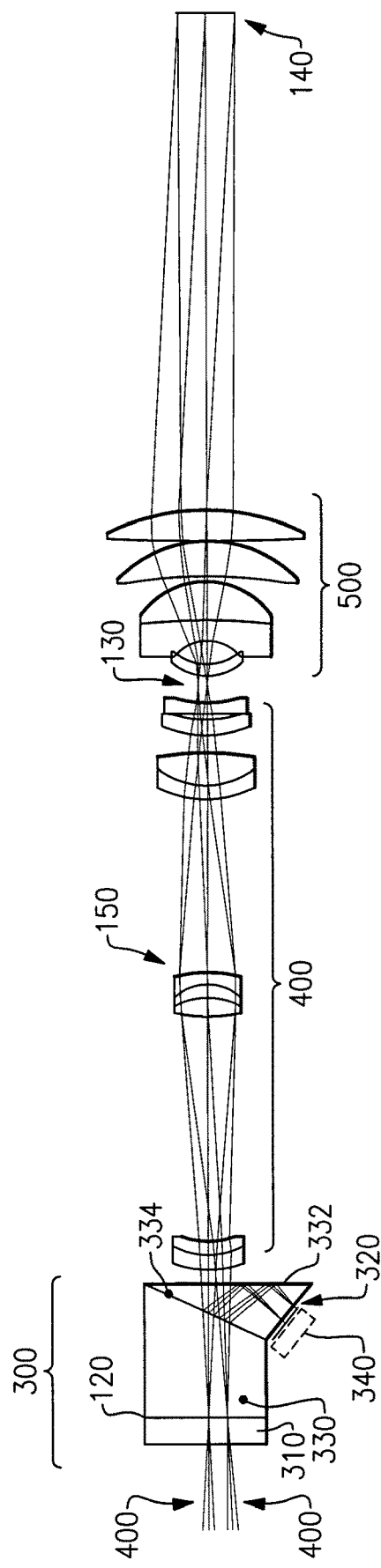
FIG. 5 is a partial ray trace of a portion of an example of the optical sighting system of FIG. 1 showing examples of the display channel injection in the reticle and display cluster, according to aspects of the present invention.

Referring to FIG. 5 there is illustrated a partial ray trace of a portion of an example of the sight 100 showing the display channel injection in the reticle and display cluster 300. As illustrated in FIG. 5, the reticle and display cluster 300 positions the display at a conjugate plane to the hard reticle plane 120 and allows the overlay of the display information on the scene imagery at the exit pupil 140.

The objective and laser rangefinder assembly 200 images the scene onto the first focal plane 120, which also contains an etched (hard) reticle. The display channel is injected at a plane 320 conjugate to the first focal plane 120. That is, light from the display plane 320 is virtually imaged at the first focal plane 120 by use of an injection path including a total internal reflection bounce off the last surface 332 of a display coupling prism 330 and a second reflection off a display dichroic mirror 334 which acts as a narrow waveband notch mirror that passes as much of the scene photopic band as possible, but also reflects very efficiently at the primary emission wavelength of the display. In certain examples, the display dichroic mirror 334 is immersed within the display coupling prism 330 and is oriented with a 30 degree angle of incidence, as shown in FIG. 5 and similar to the configuration of the laser rangefinder coupling prism 230. In certain examples the display dichroic mirror 334 is a reflective notch dichroic mirror with a narrow green (or red) reflection band. As with the laser rangefinder channel discussed above, use of this "double bounce" approach to display injection improves the efficiency of the display channel significantly, virtually eliminating polarization effects. In particular, the reduced angle of incidence (30 degrees versus 45 degrees) generates lower spectral shift with angle, and hence more even color-rendition across the image, both in scenery and any overlaid symbology. Since the display plane 320 and the reticle plane 120 are conjugate and both are imaged through the zoom relay 400 and the eyepiece 500, the information from the display is overlaid on the collimated scene at the exit pupil 140 of the sight with the same magnification at the eye as the scene. The lengths of the arms of the channels are set such that both the reticle and the display are simultaneously in focus to the user. In one example a fiber faceplate may be used to join the display 340 to the display coupling prism 330. Typically some adjustment may be needed to ensure they are co-planar.

In one example, to achieve the injection of the display light at the display plane 320, a display 340 can be physically positioned with its emitting surface at the display plane 320. In this case, the display 340 can be a self-emitting display, such as an organic light emitting diode (OLED), a backlit liquid crystal display (LCD), a microLED-type display, or a "frontlit" liquid crystal on silicon (LCOS) display. Alternatively, the display can be injected at the display plane 320 as the relayed image of an illuminated display, such as an LCOS or DMD-based display. Any of numerous illumination sources may be used for an illuminated display, as will be appreciated by those skilled in the art given the benefit of this disclosure. In certain examples, improved system performance can be achieved by using a high electrical efficiency light source with low etendue to match the sight etendue and a high photopic response and with a narrow and thermally stable waveband. Examples of such sources include a green or red LED or a VECSEL laser array with its low-speckle, narrow, thermally stable waveband, and low etendue characteristics.

The exit pupil 140 of the system as the image of the aperture stop defines an eyebox size and z-axis position in which the scene information can be viewed. The size of this eyebox varies with the zoom relay magnification. As shown in FIG. 5, the aperture stop 150 for the illustrated example of the sight 100 is located in the zoom relay 400. Provided that the display emission cone is sufficient to fill the aperture stop 150 with light for any relay magnification, as does the light 202 from the scene, the display will have the same viewing eyebox as the scene. This arrangement avoids a difficulty with placing the display at the second image plane 130 where the light output from the display would not see the same aperture stop as the scene light 202, such that the viewing eyeboxes of the display and scene would not be same.

Injecting the display in the first image plane 120 has the further advantage that when an electronic/digital reticle is generated with the display any boresight errors which are introduced to the scene by decenters and tilts of surfaces of the optical elements in the zoom relay 400 will also affect the electronic reticle. As a result, the scene and the electronic reticle remain boresighted to each other.

Efficient injection of the display light, while maintaining high transmission efficiency for the visual sighting channel (scene light 202) may be critical for system performance in maintaining display brightness and desired sighting range. In certain examples the display light is unpolarized; however, the display light may be polarized in some cases, such as if an LCOS display is used, for example. The "double-bounce" injection approach discussed above, and similar to that used in the laser channels, gives very high efficiency for transmission of the scene light 202 and coupling in of the display light, improving range performance while minimizing power.

As shown in FIG. 5, located between the display prism 330 and the eyepiece 500 is the zoom relay 400. FIGS. 6A-C illustrate an example of the optical components of the zoom relay 400 shown at different magnification positions. The zoom relay 400 relays the image, with some magnification depending on the zoom position, from the first image plane 120 to the second image plane 130 where the image is viewed by the eyepiece 500. FIGS. 6A-C shows the zoom relay 400 working at 3 different magnifications corresponding to a magnification at the eye of 8×, 4×, and 1×, respectively. The actual lateral magnification of the zoom relay 400 for FIG. 6A is −4.0, for FIG. 6B is −2.0, and for FIG. 6C is −0.5, to give a total variation of 8×.

Functionally the zoom relay 400 includes a field lens 410, a first zoom group 420, and a second zoom group 430. The first zoom group 420 contains an aperture which is the limiting system aperture defining the system aperture stop 150. As discussed above, positioning the aperture stop 150 in the first zoom group 420 allows the same viewing eyebox to be maintained for the display imagery as for the scene imagery. According to certain embodiments, the power construction and movement of the zooming groups, in addition to providing the desired image magnification, are also defined in such a way as to provide a relatively constant image position for the aperture stop 150. This image position, corresponding to the exit pupil 140, defines the position of the eye and cannot move too much as the magnification is zoomed without reducing the usefulness of the sight 100. Accordingly, the zoom relay 400 can be configured such that the first order imaging properties of the first zoom group 420, in addition to supporting the magnification requirements, also support the requirement for a fixed exit pupil location.

It may be desirable that the sight 100 display good imagery for the scene which is viewed through the objective, the etched reticle, and the display. Accordingly, in certain embodiments, the zoom relay 400 is configured to be well color corrected in itself and also to have good aberration control throughout the zoom range. In certain embodiments the zoom relay is also physically short to provide a compact sight, and therefore color correction and aberration control may be achieved through the use of particular combinations of materials for the optical elements of the zoom relay 400, including the use of very high index glass and glass with particular dispersion properties. As shown in FIGS. 6A-C, in one example the field lens 410 is a doublet made up of two lens elements. The field lens 410 may be made of a combination of a material having ultra-low dispersion and high refractive index (for one lens element of the doublet) and a high index, high dispersion glass (for the other lens element of the doublet). Using the standard international glass codes, in one example the field lens doublet 410 is made of glasses 677550/900300. As shown in FIGS. 6A-C, in one example the first zoom group 420 is a triplet made up of three lens elements. The first zoom group can be made from high index materials with low, high and moderate dispersion, respectively, for the three elements of the triplet. Using the standard international glass codes, in one example, the triplet of the first zoom group 420 is made of glasses 740520/808220/847234. As also shown in FIGS. 6A-C, in one example the second zoom group 430 includes two doublets, 432, 434. In one example the first doublet 432 is a cemented doublet (comprised of two lens elements cemented together) and the second doublet 434 is an air-spaced doublet (comprised of two lens elements spaced apart from another with an air gap in between). In one example the first doublet 432 is made of a high dispersion, high index material (for the first lens element of the first doublet) combined with a high index low dispersion material (for the second lens element of the first doublet). Using the standard international glass codes, in one example, the first doublet 432 of the second zoom group 430 is made of glasses 893203/593673. In one example the second doublet 434 is made from a high index high dispersion material (for the first lens element of the second doublet) combined with a high index lower dispersion material (for the second lens element of the second doublet). Using the standard international glass codes, in one example, the second doublet 434 of the second zoom group 430 is made of glasses 893203/834427.

Referring again to FIG. 2, in one example, the housing 610 of the sight 100 includes a zoom drive ring 640 that allows a user to adjust the zoom magnification of the sight 100 by turning the ring. As will be appreciated by those skilled in the art, the first and second zoom groups 420, 430 can be connected to movable mounts or actuators that are coupled to the zoom drive ring 640 such that turning the zoom drive ring causes one or both of the first and second zoom groups 420, 430 to move along the optical axis and thereby adjusts the magnification of the sight 100. In one example the first and second zoom groups 420, 430 are driven separately by a cam that is actuated by the zoom drive ring 640.

According to certain embodiments the tolerance space accepted for the objective and laser rangefinder assembly 200 and the zoom assembly 400 allows the sight 100 to be more compact. Typically optical assemblies are made longer in order to relax the tolerances, but this length has no benefit to the user. By accepting a tighter tolerance space the sight 100 can be made shorter and lighter, which may provide significant benefit for size and weight considerations.

Figure 7:
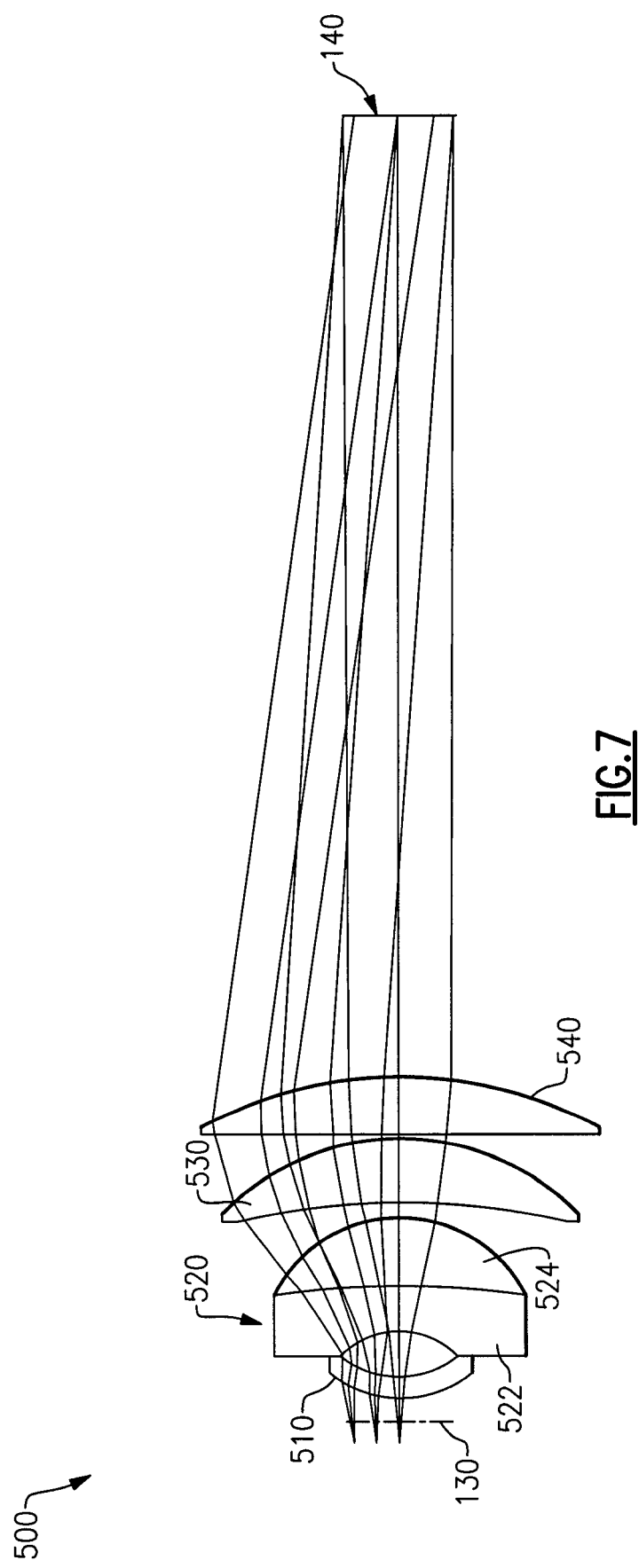
FIG. 7 is a partial ray trace of one example of the eyepiece of the optical sighting system of FIG. 1, according to aspects of the present invention.

FIG. 7 is a partial ray trace illustrating an example of the eyepiece 500. The eyepiece 500 collimates the image from the second image plane 130 for viewing by the eye. The eyepiece can be housed in a rear section 650 of the sight 100, as indicated in FIG. 2. The eyepiece may be fixed, or may be adjusted by a user for diopter adjustment. In the example illustrated in FIG. 7, the eyepiece 500 includes a field lens 510, a doublet 520, made up of first and second lens elements 522, 524, and lenses 530 and 540. In one example, using the standard international glass codes, the field lens 510 is made of glass 699300, the doublet 520 is made of glasses 102180/593673, the lens 530 is made of glass 593673, and the lens 540 is made of glass 804465. Glass 102180 is a very high index, high dispersion material, which combined with glass 593673 in the doublet 520 may provide excellent color correction.

According to certain embodiments, various optical components of the sight 100 use glasses which are on the periphery of the glass chart, namely ultra-low dispersion materials, high index low dispersion materials, or high index high dispersion materials. The use of these materials allows the sight 100 to be compact while maintaining good image quality.

Table 1 below provides an optical prescription for one example of the optical components of the sight 100. The optical prescription for this example may be generated using an equation which is an industry standard and which would be known to those skilled in the art. In Table 1, the first column (surface) identifies the optical elements of the sight, and the reference numerals corresponding to FIGS. 1, 3, 5, 6A, and 7 are given in parentheses. The column designated "Radius", provides the radius of the respective surface, measured in inches. A minus sign indicates that the center of curvature is to the left of the lens surface. The column designated "Thickness" provides the distance between the respective surface and the next surface (identified in the adjacent lower row of the table), measured in inches. The column designated "Glass" identifies the specific glass material of the respective surface. It is to be appreciated that the prescription given in Table 1 is merely exemplary, and that the prescriptions of various embodiments of the sight 100 are determined by the desired system characteristics. The values given in Table 1 correspond to the zoom position shown in FIG. 6A and a zoom magnification of 8×. As the sight 100 zooms, the thicknesses of surfaces 22, 26, and 34 vary. Table 2 below gives the thickness values as a function of sight magnification.

TABLE 1

|  | RADIUS | THICKNESS | INTERNATIONAL GLASS CODE |
|---|---|---|---|
| OBJ. | INFINITY | 200000.000000 | |
| 1 | INFINITY | 0.000000 | |
| 2 | INFINITY | 0.000000 | |
| 3 | 39.43700 | 4.500000 | 508469.6119 |
| 4 | 51.99900 | 1.930537 | |
| 5 | 37.16300 | 1.500000 | 855449.366 |
| 6 | 21.31600 | 5.850000 | 496998.8159 |
| 7 | 310.54500 | 6.303598 | |
| 8 | 16.66500 | 5.850000 | 458440.6782 |
| 9 | 33.34700 | 23.661586 | |
| 10 | −10.02400 | 2.270000 | 456500.9027 |
| 11 | −10.23400 | 1.500000 | 953749.3232 |
| 12 | −17.95600 | 1.201846 | |
| 13 | INFINITY | 10.500000 | 647693.3384 |
| 14 | INFINITY | 0.452432 | |
| 15 | 94.41800 | 4.000000 | 953749.3232 |
| 16 | −24.14800 | 0.780000 | |
| 17 | INFINITY | 3.700000 | 568832.5606 |
| 18 | INFINITY | 23.000000 | 568832.5606 |
| 19 | INFINITY | 3.179731 | |
| 20 | 21.05900 | 2.370000 | 677903.5556 |
| 21 | 11.55100 | 2.700000 | 903664.3132 |
| 22 | 17.33400 | 3.399430 | |
| 23 | 87.34800 | 2.950000 | 740999.5268 |
| 24 | −11.77500 | 2.500000 | 808095.2276 |
| 25 | −8.32100 | 2.000000 | 846669.2383 |
| STOP | −23.91900 | 1.994340 | |
| 27 | 20.79300 | 2.000000 | 892860.2036 |
| 28 | 13.61600 | 5.500000 | 593490.6733 |
| 29 | −67.00600 | 3.070893 | |
| 30 | 21.59300 | 3.000000 | 892860.2036 |
| 31 | 41.56500 | 0.586730 | |
| 32 | −802.04200 | 2.000000 | 834813.4274 |
| 33 | 17.90000 | 0.982703 | |
| 34 | INFINITY | 68.965600 | |
| 35 | INFINITY | 2.012606 | |
| 36 | 10.53300 | 2.000000 | 698948.3005 |
| 37 | 9.22300 | 4.043641 | |
| 38 | −7.37600 | 4.100000 | 2.1029:18.051 |
| 39 | −79.03500 | 6.500000 | 593490.6733 |
| 40 | −13.24300 | 1.185373 | |
| 41 | −74.88600 | 6.100000 | 593490.6733 |
| 42 | −22.01000 | 0.300000 | |
| 43 | 1449.09500 | 5.400000 | 804005.4659 |
| 44 | −38.10800 | 78.000000 | |
| IMAGE | INFINITY | 0.000000 | |

TABLE 2

| Magnification | Thickness S22 | Thickness S26 | Thickness S34 |
|---|---|---|---|
| 8 | 3.399 | 1.994 | 68.966 |
| 4 | 6.958 | 29.893 | 37.519 |
| 1 | 40.794 | 31.423 | 2.155 |

Figure 8:
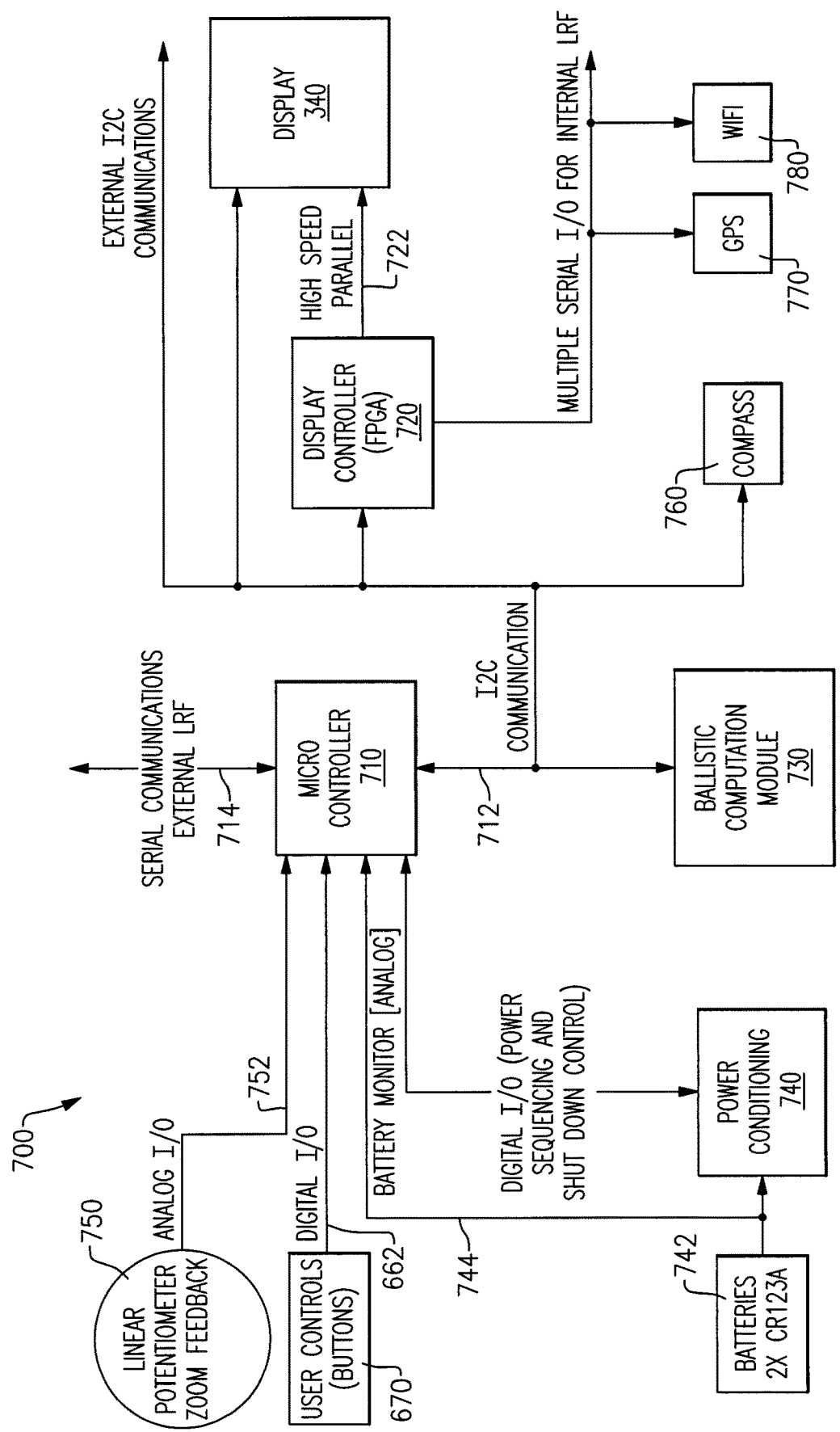
FIG. 8 is a block diagram of one example of an electronic control system for the optical sighting system according to aspects of the present invention.

Embodiments of the sight 100 may also include an electronic control system that controls various operational aspects of the sight 100. Referring again to FIG. 2, the electronic control system may be packaged onto the side of the sight 100, as indicated at 660 in FIG. 2. Although not shown in FIG. 2, externally the sight 100 may include batteries that can be replaced through one or more battery caps, and may also include a connector having a cable extending from it that can lead to an external laser rangefinder (if desired), or to a remote laser rangefinder trigger. Internally, the electronic control system may include various electronic boards and components to drive the display 340 and other components of the sight 100. FIG. 8 is a block diagram of one example of the electronic control system for the sight 100. The electronic control system 700 includes an embedded master microcontroller 710, a display controller 720, a ballistic computation module 730, a power conditioning sub-system 740, and electronics for input/output such as feedback elements and communication. The master microcontroller 710 controls/arbitrates all systems. The electronic control system 700 may additionally include environment instruments, such as sensors (e.g., temperature, humidity, or altitude sensors), a compass 760, and a GPS unit 770, for example. In certain examples the electronic control system can include a wireless connectivity unit 780. The compass 760, GPS unit 770, and wireless connectivity unit 780 may provide situational awareness, and allow a command center or other users/personnel to know where the sight 100 is located and what is being viewed through the sight.

Referring to FIG. 8, the electronic control system 700 further includes a power source 742 connected to the power conditioning sub-system 740. The power source 742 may include one or more batteries. In one example the power source 742 includes two CR123A lithium cells. The power source 742 is used by the power conditioning sub-system to provide all of the different power forms used by the sight 100. In certain embodiments, the power conditioning sub-system 740 has built-in switching functionality which allows the microcontroller 710 to shut down different sub-systems to reduce power consumption. As indicated by line 744, the power source 742 may be monitored for display of current power state (e.g., battery charge state) in the display system in the sight 100.

According to certain embodiments the sight 100 is configured to provide automatic display information overlay adjustment. As the sight 100 is zoomed, the active area of the display 340 viewable in the eyepiece 500 becomes smaller. In order to keep relevant information viewable, the font size is scaled and the information repositioned based upon the current zoom of the sight 100. In one example this accomplished through a linear potentiometer 750 coupled to the moving zoom elements. The microcontroller 710 has an analog I/O 752 dedicated for the linear potentiometer 750 that provides feedback information on the current position of zoom. That information is used to adjust display overlay font sizes and the position of all overlays with respect to zoom. As discussed above, in one example the zoom relay 400 includes first and second moving zoom groups 420, 430 that are driven by a cam actuated by the zoom drive ring 640. In one example the linear potentiometer 750 provides feedback by measuring movement on a sloped surface on the end of the cam. This will provide information on the rotation angle of the zoom, which can be fed to the display controller, allowing the size of the display features (such as text) to be varied as the sight 100 is zoomed.

Referring to FIGS. 2 and 8, in certain embodiments the sight 100 and electronic control system 700 include a user interface 670. In the example illustrated in FIG. 2, the user interface 670 includes a four button keypad system that can provide a menu structure to the user for operation command, diagnostics, and settings. The user interface is connected to the microcontroller 710, as indicated by line 662, to allow control of settings, to turn the system on/off, to initiate a laser ranging, ballistic computation, and to disturb the electronic reticle.

Still referring to FIG. 8, in certain examples the ballistic computation module 730 communicates with the master microcontroller 710 over an I2C interface indicated by line 712. When the system is commanded through the user interface 670 to lase a target the laser rangefinder is initiated to range, when a valid range is received, it can be given to the ballistic computation module 730 along with the relevant ballistic information. The ballistic computation module 730 then computes what the ballistic drop is, and that information is used to disturb the reticle location by the correct number pixels to provide a new aiming position.

In certain examples the display controller 720 is a field programmable gate array (FPGA) and provides all timing control for the display 340. The display controller 720 may also provide control of font generation for display information, and reticle positioning and overlay control. In one example the functionality of the display controller 720 is accessed by the master microcontroller 710 over the I2C serial communication link 712. In one example, all positioning of all overlay elements is determined by the microcontroller 710 and executed by the display controller 720. In certain examples the display 340 has basic control implemented by the I2C serial communication link 712. For example, the display 340 can be turned on/off, have brightness controlled, etc. via commands provided over this link 712. A second interface to the display 340 can also be provided. In the example shown in FIG. 8, the second interface is a high speed parallel bus, indicated by line 722, which is driven by the display controller 720. Timing signals (hclks, vclks) and pixel data can be provided from the display controller 720 to the display 340 via this bus 722.

As discussed above, the electronic control system may further include an additional serial communications link 714 to allow an external laser rangefinder to be connected.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

The invention claimed is:

1. A direct view optical sighting system comprising:
an eyepiece;
an objective configured to receive scene light from a viewed scene and direct the scene light along an optical path to the eyepiece;
a laser rangefinder configured to emit a laser transmit beam and to receive a laser return beam corresponding to at least a portion of the laser transmit beam reflected from an object in the viewed scene;
a laser rangefinder coupling prism configured to direct the laser transmit beam from the laser rangefinder to the objective via reflections off two surfaces of the laser rangefinder coupling prism, and to direct the laser return beam from the objective to the laser rangefinder via reflections off the two surfaces of the laser rangefinder coupling prism;
a display assembly including a reticle prism and a display coupling prism, the reticle prism being positioned along the optical path between the laser rangefinder coupling prism and the display coupling prism, the reticle prism having a hard reticle formed on a first surface thereof, the objective being configured to produce a first focal plane of the optical sighting system coincident with the first surface of the reticle prism, the display coupling prism being configured to couple display light into the optical path and to direct the display light toward the eyepiece via reflections off two surfaces of the display coupling prism; and a zoom relay positioned between the display coupling prism and the eyepiece, the zoom relay being configured to relay the scene light along the optical path from the first focal plane to a second focal plane positioned between the zoom relay and the eyepiece, the zoom relay being further configured to adjust a magnification of the optical sighting system over a predetermined magnification range, and an aperture stop of the optical sighting system being positioned within the zoom relay.

2. The direct view optical sighting system of claim 1 wherein the eyepiece is configured to receive and collimate the scene light and the display light from the second focal plane to produce a collimated output beam at an exit pupil of the optical sighting system.

3. The direct view optical sighting system of claim 2 wherein the eyepiece includes a field lens, a first eyepiece lens, a second eyepiece lens positioned along the optical path between the first eyepiece lens and the exit pupil, and an eyepiece doublet lens positioned along the optical path between the field lens and the first eyepiece lens.

4. The direct view optical sighting system of claim 3 wherein the field lens is made of glass specified by international glass code 699300, the eyepiece doublet of glasses specified by international glass codes 102180/593673, the first eyepiece lens is made of glass specified by international glass code 593673, and the second eyepiece lens is made of glass specified by international glass code 804465.

5. The direct view optical sighting system of claim 2 wherein the two surfaces of the laser rangefinder coupling prism include a first surface and an embedded dichroic mirror, the embedded dichroic mirror being configured to transmit the scene light along the optical path and to reflect the laser transmit beam and the laser return beam, and the first surface being arranged at an angle of 30 degrees relative to the dichroic mirror and configured to reflect the laser transmit beam and the laser return beam.

6. The direct view optical sighting system of claim 2 wherein the laser rangefinder includes a laser source configured to emit the laser transmit beam, a detector configured to receive the laser return beam, and a beamsplitter assembly configured to direct the laser transmit beam toward to the laser rangefinder coupling prism and to direct the laser return beam to the detector.

7. The direct view optical sighting system of claim 6 wherein the beamsplitter assembly includes a pick-off mirror that reflects the laser transmit beam toward the laser rangefinder coupling prism, the pick-off mirror being positioned as a central obscuration in a path of the laser return beam, such that the laser return beam has an annular footprint at the detector.

8. The direct view optical sighting system of claim 2 wherein the two surfaces of the display coupling prism include a first surface and an embedded dichroic mirror, the first surface being arranged at an angle of 30 degrees relative to the dichroic mirror and configured to reflect the display light onto the embedded dichroic mirror, and the embedded dichroic mirror being configured to transmit the scene light along the optical path and to reflect the display light into the optical path toward the zoom relay.

9. The direct view optical sighting system of claim 8 wherein the embedded dichroic mirror is a reflective notch dichroic mirror having a green or red reflection band.

10. The direct view optical sighting system of claim 8 wherein the display assembly further includes a display configured to produce the display light, the display light including an electronic reticle and sighting information.

11. The direct view optical sighting system of claim 10 further comprising an electronic control system, the electronic control system including a display adjustment mechanism configured to maintain a constant size of the electronic reticle and a constant font size of the sighting information over the magnification range of the optical sighting system.

12. The direct view optical sighting system of claim 11 wherein the display adjustment mechanism includes a linear potentiometer coupled to at least one component of the zoom relay.

13. The direct view optical sighting system of claim 2 wherein the zoom relay includes a field lens, a first movable zoom lens group, and a second movable zoom lens group positioned between the first movable zoom lens group and the exit pupil, wherein movement of the first and second movable zoom lens groups along the optical path adjusts the magnification of the optical sighting system over the magnification range.

14. The direct view optical sighting system of claim 13 wherein the magnification range is 1× to 8×.

15. The direct view optical sighting system of claim 13 wherein the zoom relay is configured to provide a constant image position for the aperture stop over the magnification range, the image position corresponding to a location of the exit pupil.

16. The direct view optical sighting system of claim 15 wherein the aperture stop is located within the second movable zoom lens group.

17. The direct view optical sighting system of claim 13 wherein the field lens is a doublet made of a combination of a first glass material having ultra-low dispersion and high refractive index, and a second glass material having a high refractive index and high dispersion.

18. The direct view optical sighting system of claim 13 wherein the first movable zoom lens group is a triplet, and the second movable zoom lens group includes two doublets, the triplet and the two doublets each including a combination of glass materials having different dispersion.

19. The direct view optical sighting system of claim 1 further comprising a housing, the eyepiece, the objective, the laser rangefinder coupling prism, the display assembly, and the zoom relay being housed within the housing, the housing including a zoom drive ring coupled to at least one component of the zoom relay, wherein rotation of the zoom drive ring adjusts the magnification of the optical sighting system over the magnification range.

* * * * *